United States Patent [19]

Klomhaus et al.

[11] Patent Number: 5,194,038
[45] Date of Patent: Mar. 16, 1993

[54] ONE-WAY AIR VALVE

[75] Inventors: Jaime L. Klomhaus, Shelby Township; Macomb County; Scott M. Bell, St. Clair; Richard J. Barton, Port Huron, all of Mich.

[73] Assignee: Huron Plastics Group, Inc., St. Clair, Mich.

[21] Appl. No.: 905,769

[22] Filed: Jun. 29, 1992

[51] Int. Cl.5 ............................................. B60H 1/26
[52] U.S. Cl. ................................ 454/162; 137/512.1; 137/855
[58] Field of Search ............... 137/512.1, 512.15, 855; 454/162, 164, 165, 154, 155, 259, 359

[56] References Cited

U.S. PATENT DOCUMENTS

| | | | |
|---|---|---|---|
| 249,557 | 11/1981 | Truesdell | 137/855 |
| 1,881,929 | 10/1932 | Pottenger, jr. | 137/855 X |
| 3,568,977 | 3/1971 | Nelson | 251/148 |
| 4,324,097 | 4/1982 | Schmitt et al. | 60/293 |
| 4,558,634 | 12/1985 | Oshiro et al. | 454/165 |
| 4,653,726 | 3/1987 | Lang et al. | 251/337 |
| 4,691,623 | 9/1987 | Mizusawa | 137/512.15 X |
| 4,781,106 | 11/1988 | Frien | 454/164 |
| 4,972,765 | 11/1990 | Dixon | 137/855 X |

FOREIGN PATENT DOCUMENTS

| | | | |
|---|---|---|---|
| 159057 | 2/1983 | German Democratic Rep. | 454/164 |
| 61013 | 4/1983 | Japan | 454/164 |
| 188218 | 8/1986 | Japan | 454/164 |

Primary Examiner—Harold Joyce
Attorney, Agent, or Firm—Brooks & Kushman

[57] ABSTRACT

A one-way air valve for relieving pressure within the passenger compartment of an automobile includes a plastic frame having an air passage therethrough with a flap integrally molded with the frame but of more elastic material and connected to the frame by a living hinge. The flap is molded in a position extending through the passageway and the living hinge is spring loaded by swinging the flap back through the passageway to overlie the outside of the frame over the passageway, thereby biasing the flap against the frame.

5 Claims, 1 Drawing Sheet

ONE-WAY AIR VALVE

FIELD OF INVENTION

This invention relates to one-way check valves and particularly to such a valve for use in conjunction with air vent control for the passenger compartment of automotive-type vehicles.

BACKGROUND OF THE INVENTION

With the advent of nearly air-tight passenger compartments for automobile bodies, the need has arisen to provide venting which will permit the escape of air pressure occasioned by the slamming or rapid closure of the vehicle door while preventing the entry of outside air. U.S. Pat. Nos. 4,691,623 and 4,972,765 disclose devices for permitting the escape of air from the passenger compartment to the outside of the body. The devices disclosed in these patents require two or more parts to be assembled together, such as a frame structure and a valve structure, and this necessarily raises the cost of the device.

Other patents showing one-way check valves are: U.S. Pat. Nos. 2,249,557; 1,881,929; 3,568,977; 4,324,097.

Of these, U.S. Pat. Nos. 2,249,557 and 1,881,929 show a flap which is formed integrally with the valve seat. In both cases the flap and valve seat are formed of the same material and only gravity serves to bias the flap against the valve seat, and as a consequence the flap may readily flutter open.

SUMMARY OF THE INVENTION

The invention herein disclosed comprises a one-way air valve for mounting, for example, in the fire wall of the vehicle body and includes a molded plastic frame with an integrally molded plastic flap adapted to overlie the outside of the frame and cover an air passageway therein. The flap is swingable away from the frame to open the passage to allow escape of air from the passenger compartment and is tensioned against the frame over the passageway to keep it closed and prevent ingress of unwanted outside air. The flap has a plastic connecting portion or living hinge molded in situ integrally with the frame and flap and formed of a more elastic plastic than that of the frame. The flap is originally molded in a position projecting through the air passageway and is swung from this position through the passageway to overlie the outside thereof with such swinging movement elastically loading the connecting hinge portion to bias the flap against the outside of the frame over the air passageway.

As a result of this construction, separate parts do not need to be assembled together as the entire structure is molded as a single unit. Following the molding operation it is only necessary to swing the air flap through the passageway to overlie the outside of the frame over the passageway. The valve may be assembled in a provided opening in the fire wall or other wall of the vehicle.

BRIEF DESCRIPTION OF PREFERRED EMBODIMENT

Figure 1:
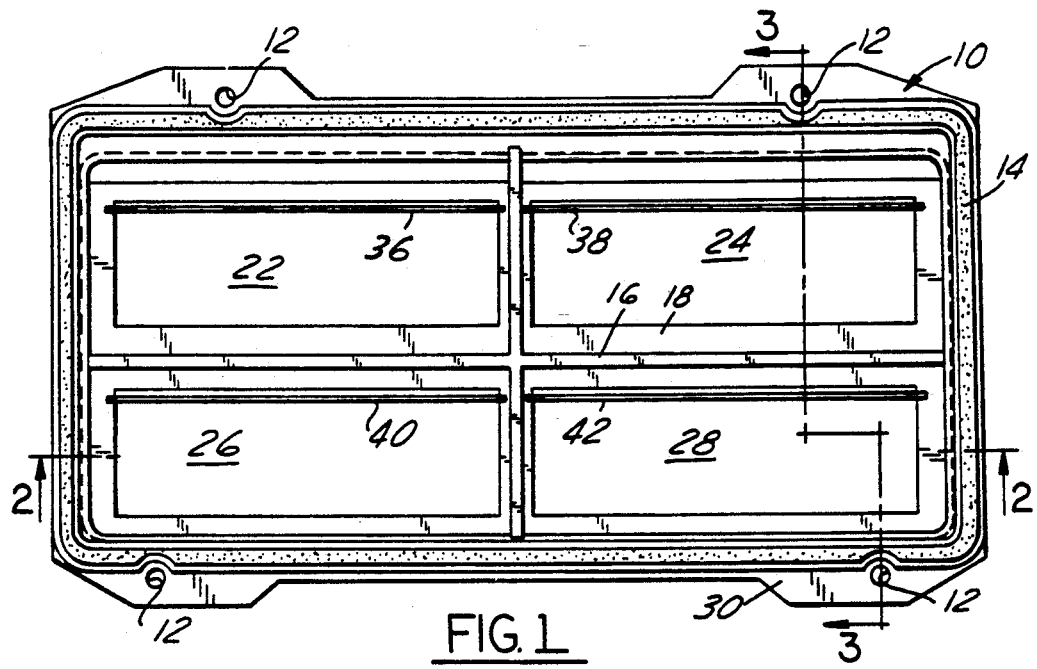
FIG. 1 is a front elevation of a valve structure embodying the invention looking at the inside of the frame, i.e., looking at that side of the frame which faces inwardly toward the passenger compartment, and showing the flaps in the positions in which they are originally molded.

A one-way air valve for relieving pressure within an automobile compartment, such as the passenger compartment when a door is closed rapidly, is shown in the drawings as comprising a molded plastic frame 10 for mounting by fasteners (not shown) which are extended through apertures 12 in the frame for connection to the fire wall or other wall (not shown) of the vehicle. The frame has an encircling shroud 14 within which there is a downwardly sloping partition 16, see FIG. 3, having an inside face 18 and an outside face 20 with air passageways 22, 24, 26 and 28 extending through the partition between the inside and outside faces. The passageways are shown as being rectangular in FIG. 1. The frame also includes an outside flange portion 30 provided with a peripheral lip 32 carrying a sealing strip 34 for bearing against the fire wall and sealing the frame thereagainst. It is understood, of course, that there is an opening through the fire wall over which the frame 10 is affixed with the lip 32 and sealing strip 34 bearing against the fire wall around such opening.

Figure 5:
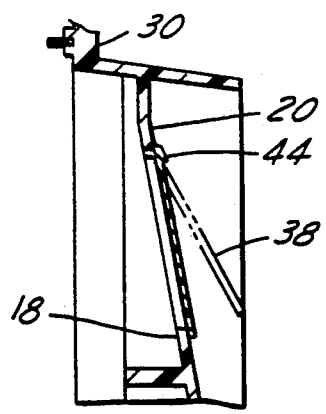
FIG. 5 shows the flap in operative position.

A plastic flap, best shown in FIG. 5 at 38, overlies the outside face 20 of the frame and covers the associated air passageway therein to block air flow into the passenger compartment and is swingable away from the frame to open the passageway upon air pressure build-up in the passenger compartment of the automobile, as where a car door is quickly closed. Four such flaps are provided indicated at 36, 38, 40 and 42 in FIG. 1 where they are shown in the positions in which they are molded.

Figure 2:
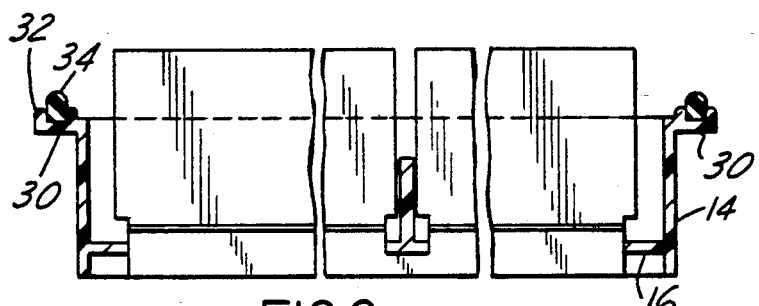
FIG. 2 is a cross-sectional view taken on the line 2—2 of FIG. 1.
Figure 4:
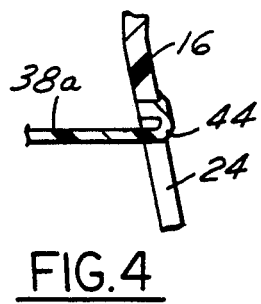
FIG. 4 is an exploded view through the flap hinge portion of the valve structure.
Figure 3:
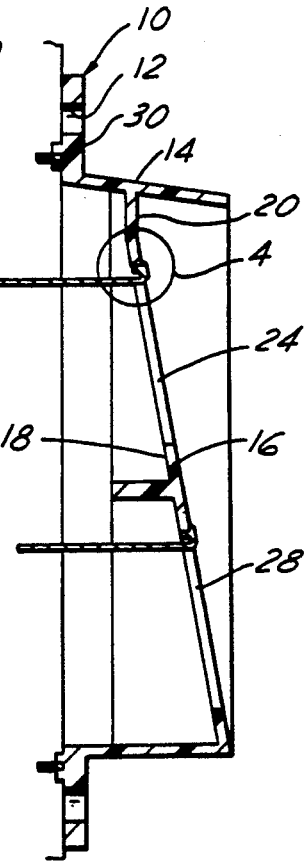
FIG. 3 is a cross-sectional view taken on the line 3—3 of FIG. 1.

As each of the flaps is similar, a description of one will suffice. The flap is generally rectangular to overlie the partition of the frame and completely cover the associated air passageway. The flap is formed of plastic and has a plastic connecting portion 44, best shown in FIG. 4. The flap is molded in situ integrally with the frame. The flap and connection portion is formed of a more elastic plastic than the plastic of the frame 10. The flap portion, which may also be considered a living hinge, is resistingly bendable to permit the flap to be swung from an initial molded position shown in FIGS. 1–4 (in FIG. 4 indicated at 38a) in which it projects through the air passageway as shown in FIGS. 1-3 and beyond the inside face 18 of the frame. It may be swung from this initial molded position to the operative position shown at 38 in FIG. 5 where it overlies the outside face 20 of the frame and covers the associated air passageway. Each flap portion 44 is elastically loaded by the aforesaid swinging of the flap from the initial position 38a to the operative position as shown in FIG. 5. This elastic loading serves to bias or urge the flap yielding against the outside of the frame covering the air passageway. This living hinge or flap portion 44, when the flap is in its operative position, will yield to an increase in air pressure in the passenger compartment of the automobile, as when a car door is quickly closed, to allow the flap to open and vent air within the passenger space to the outside of the vehicle. At the same time the flap portion 44 biases the flap against the outer surface 14 of the frame. In this respect it is assisted by the gravity of the flap lying against the downwardly and outwardly sloping partition 16 of the frame.

The flap, though larger than its associated air passageway, is sufficiently elastic that it may be deformed sufficiently so that it will pass therethrough as it is swung from its molded to its operative position. Because of the elasticity of the flap, it will spring back to its normal shape after being deformed to pass through the opening. It is nevertheless stiff enough so that while overlying the partition and covering the opening it will not collapse inwardly by anticipated negative pressures within the passenger compartment.

The frame may be formed of any suitable plastic. Reinforced polypropylene is satisfactory for this purpose as are polystyrene, polyvinylchloride and the like. The flap and living hinge may be formed of a thermoplastic rubber such as Santoprene, available from Advanced Elastomers System, and Kraton, a product of Shell Chemical Corporation. Other elastic or rubber-like plastics may also be used. The flap and frame are integrally molded in a two-shot molding process. Such a process may be carried out using a two-shot molding machine such as made by Battenfeld Maschinenfabriken GMBh & Co. KG of Meinerzhagen, Germany. The operation of such machine is understood by those skilled in this art.

While the valve shown herein is described in relation to an automobile passenger compartment vent, it should be understood that the concept is applicable to one-way fluid valves in general. The loading of the living hinge by swinging it from its molded position through the passageway to its operative position to cause the hinge to yieldingly bias the flap against the outer surface of the frame around the passageway in combination with the two-shot molding process makes possible the manufacture of the valve at a competitively low cost.

We claim:

1. A one-way air valve for relieving pressure within an automobile compartment when a door is closed rapidly comprising, in combination:
    a molded plastic frame for mounting at an aperture of a compartment wall and having an inside face and an outside face with at least one air passageway extending therethrough between the faces;
    a plastic flap overlying the outside face of the frame and covering the air passageway to block air flow into the automobile and swingable away from the frame to open the passageway upon air pressure build-up in the compartment;
    said flap having a plastic connecting portion molded in situ integrally with the frame and being formed of a more elastic plastic than the plastic of the frame and resistingly bendable to permit the flap to be swung from an initial molded position projecting through the air passageway and beyond the inside face of the frame to an operative position overlying the outside face of the frame and covering the air passageway, said flap portion being elastically loaded by the aforesaid swinging of the flap from said initial position to said operative position to urge the flap yieldingly against the outside of the frame covering the air passageway; and
    said flap portion, when the flap is in said operative position, blocking air flow through the air passageway in a direction to enter an automobile compartment and yielding to an increase in air pressure in such compartment to open and allow air flow through the passageway out of the compartment.

2. The invention of claim 1 wherein the frame is formed of plastic selected from the group consisting of polypropylene, polystyrene, polyvinyl chloride.

3. The invention of claim 1 wherein the flap and hinge is formed of plastic selected from the group consisting of thermoplastic rubber.

4. The invention of claim 1 wherein the frame is formed of a plastic selected from the group consisting of polypropylene, polystyrene, polyvinyl chloride, and the flap and hinge is formed from a plastic selected from the group consisting of thermoplastic rubber.

5. A one-way fluid flow control valve comprising, in combination:
    a molded frame having an inside face and an outside face with at least one fluid passageway extending therethrough between the faces;
    a plastic flap overlying the outside face of the frame and covering the passageway to block fluid flow in one direction and swingable away from the frame to open the passageway upon fluid flow in the opposite direction;
    said flap having a plastic connecting portion molded in situ integrally with the frame and being formed of a more elastic plastic than the plastic of the frame and resistingly bendable to permit the flap to be swung from an initial molded position projecting through the passageway and beyond the inside face of a frame to an operative position overlying the outside face of the frame and covering the passageway, said flap portion being elastically loaded by the aforesaid swinging of the flap from said initial position to said operative position to urge the flap yieldingly against the outside of the frame covering air passageway; and
    said flap portion, when the flap is in said operative position, blocking fluid flow through the passageway in one direction and yielding to fluid flow in the opposite direction to open and allow flow through the passageway.

* * * * *